United States Patent [19]

Buchbauer

[11] Patent Number: 5,024,713

[45] Date of Patent: Jun. 18, 1991

[54] METHOD OF APPLYING ORNAMENTAL ELEMENT WITH A SHAFT OF MELT ADHESIVE

[75] Inventor: Burkhart Buchbauer, Wattens, Austria

[73] Assignee: D. Swarovski & Co., Wattens, Austria

[21] Appl. No.: 406,765

[22] Filed: Sep. 13, 1989

Related U.S. Application Data

[63] Continuation of Ser. No. 164,179, Mar. 4, 1988, abandoned.

[51] Int. Cl.[5] .......................... A44B 1/18; C09J 5/02; B32B 31/20

[52] U.S. Cl. .......................... 156/221; 156/92; 156/293; 156/308.4; 156/309.6; 24/90 HA; 24/693

[58] Field of Search .......................... 156/73.1, 73.5, 92, 156/580.2, 196, 219, 221, 272.2, 293, 308.2, 308.4, 309.6; 264/293; 24/693, 90 HA, DIG. 11

[56] References Cited

U.S. PATENT DOCUMENTS

| | | |
|---|---|---|
| 2,470,963 | 5/1949 | Weyl . |
| 2,569,398 | 9/1951 | Burd et al. . |
| 3,499,808 | 3/1970 | Obeda . |
| 3,650,647 | 3/1972 | Jacobs et al. . |
| 4,312,077 | 1/1982 | Petersson . |

*Primary Examiner*—Michael W. Ball
*Assistant Examiner*—Gregory J. Wilber
*Attorney, Agent, or Firm*—Fay, Sharpe, Beall, Fagan, Minnich & McKee

[57] ABSTRACT

A method for applying ornamental elements is described. These elements have a layer of melt adhesive provided on the application side. The melt adhesive layer is designed as a shaft extending in the application direction, which can be passed through perforated material in order to obtain a good connection with the application material, in particular in the case of stratified materials such as leather, due to the formation of a flange on the back of the material.

5 Claims, 2 Drawing Sheets

METHOD OF APPLYING ORNAMENTAL ELEMENT WITH A SHAFT OF MELT ADHESIVE

Figure 1:
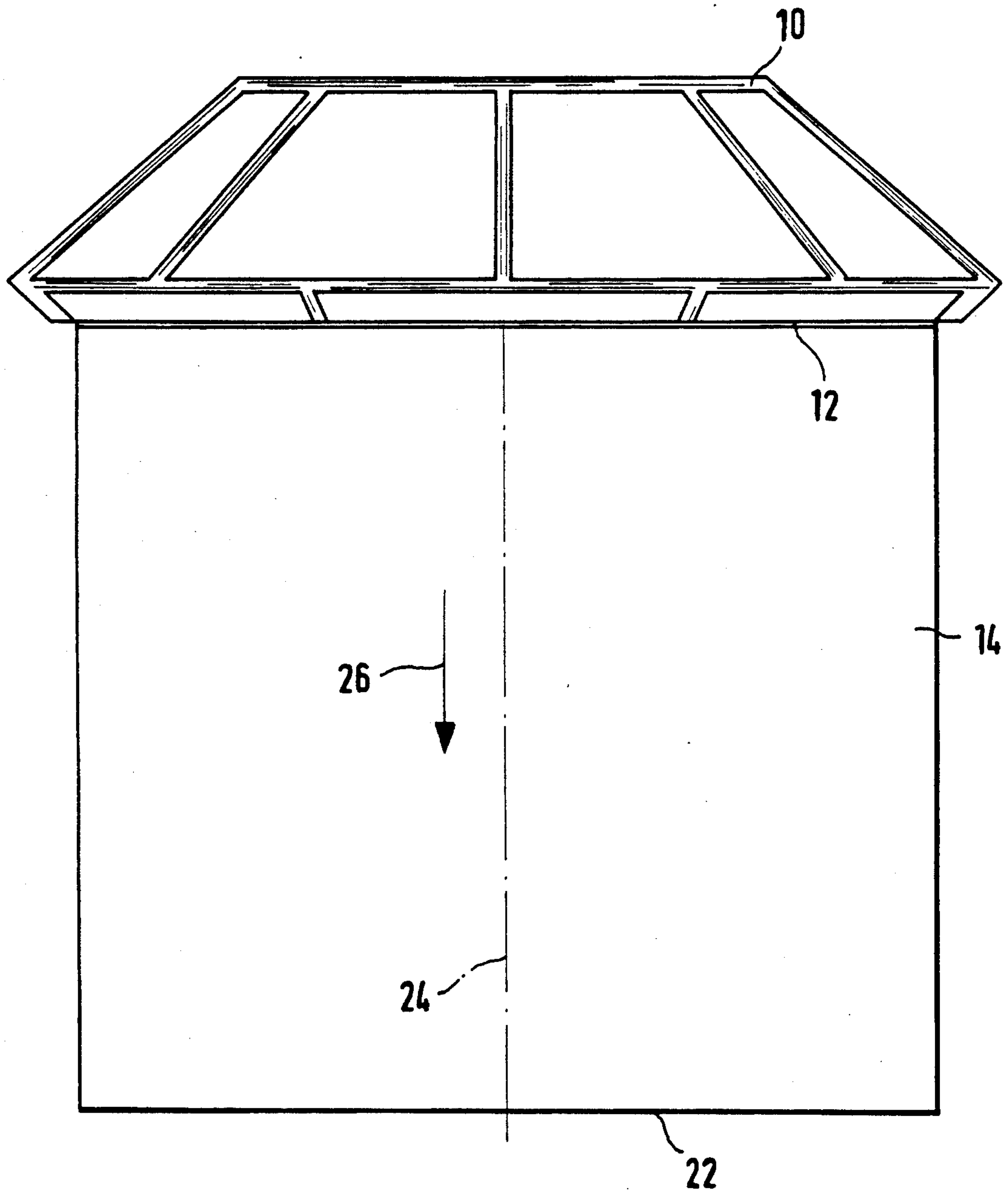

This is a continuation of co-pending application Ser. No. 164,179 filed on Mar. 4, 1988 now abandoned.

The present invention relates to a method of applying ornamental elements.

Ornamental elements serve to decorate objects such as articles of clothing and accessories.

A known ornamental element of this type (German Pat. No. 25 20 126) is designed as a stud and has on the underside a melt adhesive layer capable of being made adhesive by supply of heat. The advantage of this known ornamental element compared to conventional ornamental studs of this kind is that it can be connected with the material by being simply applied thereto and then heated without any necessity of perforating the material.

However, it has turned out that with some materials, such as stratified materials or suede, this known ornamental element involves the danger of the upper layer of material containing the ornamental element coming off the rest of the material during use, thereby shortening the lifetime or the esthetic appearance of the article.

U.S. Pat. No. 2,470,963 discloses an ornamental element, more precisely a button, whose underside is provided with a melt adhesive layer. This layer is shaped as a cylindrical shaft and connects with the fabric when heated. However, in this case a flange formed by heat fixing can only have a diameter corresponding to the diameter of the application side. This makes it impossible to attach such an element reliably to a synthetic or leather material.

The present invention is thus based on the problem of providing a method for applying an ornamental element of the type stated at the outset which allows for reliable connection with the application material, in particular with stratified materials, leather, especially suede, etc.

This problem is solved by the inventive method according to which a perforated application material is used, a shaft of melt adhesive provided on the ornamental element and extending from the ornamental element in the application direction is passed through the perforation, heat is supplied to the shaft to soften the melt adhesive, the softened shaft is formed by pressure into a flange on the side of the application material opposite the decorating side and the melt adhesive is allowed to cool.

This method makes it possible to pass the ornamental element through the application material and form by subsequent heating a flange on the back of the material for connecting the ornamental element firmly with the application material.

According to an advantageous embodiment of the inventive method, the ornamental element is designed as a stone. Such an ornamental element allows for the ornament to be designed in any desired shape, whereby a simple connection of the melt adhesive layer with the back of the ornamental stone is ensured due to the usual cut shape of the stone.

The shaft has a cylindrical design with a cylinder axis extending in the application direction. Such a cylinder is the most favorable shape for taking up a sufficient amount of melt adhesive with the smallest volume, whereby it is also capable of being passed through the application material without any problem.

Since the cylindrical shaft has a diameter corresponding approximately to the area of the application side of the ornamental element, a good connection of the melt adhesive layer to the ornamental stone is ensured.

Finally, the shaft advantageously has a length of approximately 1 to 5 mm in order to provide a sufficient adhesive layer for forming the flange.

An ornamental element used in accordance with the inventive method is shown in the drawing and shall be described in the following in more detail.

Figure 2:
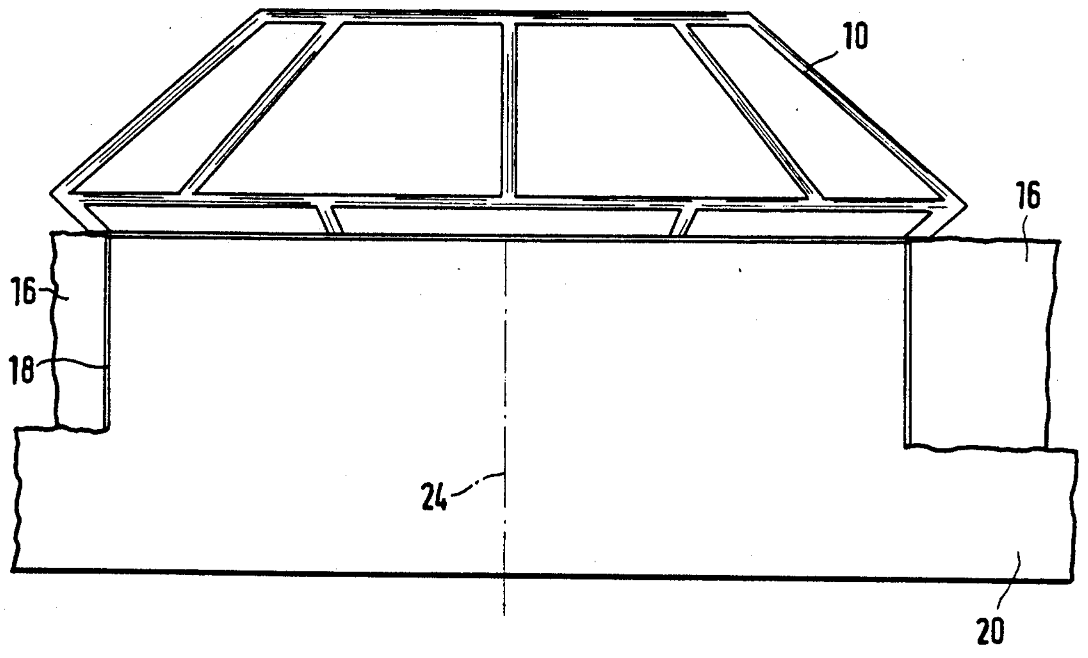

FIG. 1 shows a schematic side view of the ornamental element in a state prior to application to an application material; and FIG. 2 shows an ornamental element applied to an application material.

The ornamental element shown in the figures comprises an ornamental cut stone 10, made e.g. of glass or a suitable synthetic material, which is connected on its flat back application side 12 with a shaft 14 consisting of a melt adhesive. The material for the melt adhesive may be selected from nonhardening meltable resins with additives of macromolecular substances, e.g. polyamides, ethyl cellulose, polyvinyl acetate and the like, and self-hardening synthetic materials. Synthetic materials of this kind to be used include polyester resins, epoxy resins, isocyanates and aminoplastics, optionally with catalysts added.

The material of the ornamental element is not limited to glass or synthetic material; any material may be used, in particular metals such as chrome-plated, copper-plated, silver-plated steel sheet and the like, and a great variety of colored synthetic materials.

In the embodiment shown, shaft 14 has a cylindrical shape with a cylinder axis 24 extending in application direction 26. Cylindrical shaft 24 has a diameter corresponding approximately to the area of application side 12 of ornamental element 10. The length of shaft 14 is between 1 mm and 5 mm, depending on the thickness of application material 16.

FIG. 2 shows ornamental element 10 in its state of application to application material 16. A shaft flange 20 is formed on the underside of the application material by heating of shaft 14 and pressing with application material 16, and connects ornamental element 10 reliably with the application material. Flange 20 is formed in a way known as such by applying a heating surface to underside 22 of the shaft, which melts the melt adhesive, and then pressing it with application material 16. Shaft flange 20 has a substantially smaller thickness than application material 16 so that the wearing properties, e.g. of articles of clothing, are not impaired.

As shown in FIG. 2, one can connect the ornamental element with application material 16 by simply passing it through a perforation 18 in said material 16 in application direction 26 parallel to longitudinal axis 24 of the cylinder and then heating shaft underside 22 and pressing it with application material 16.

In the ornamental element described, shaft 14 has a cylindrical shape. Its diameter corresponds approximately to the area of application side 12 of ornamental element 10. However, it is also conceivable, depending on the shape and size of the ornamental element, for the shaft to have a somewhat larger or a somewhat smaller diameter than the underside of the ornamental element. Further, its shape is not necessarily limited to a cylinder with a longitudinal axis 24 extending in application direction 26; any expedient shape of the shaft can be selected, provided it meets the criteria of a good connection with application side 12 of ornamental element 10, an unimpeded passage through perforation 18 of application material 16 and a sufficient amount of melt adhesive.

The method of applying ornamental elements is suitable for decorating any materials, in particular textiles and leather of all kinds.

I claim:

1. A method for applying ornamental elements, comprising the steps of:

providing an ornamental element having a back side, and including a shaft of melt adhesive secured to said ornamental element back side, wherein a diameter of said melt adhesive shaft is of approximately the same size as a diameter of said ornamental element back side, providing a perforated application material having a front side and a back side, passing through a perforation of the application material said shaft of melt adhesive provided on the ornamental element, supplying heat to the shaft to soften the melt adhesive, forming the softened shaft by pressure into a flange on the back side of the application material wherein said step of forming the softened shaft into a flange continues until the flange has a diameter larger than a diameter of said ornamental element, and allowing the melt adhesive to cool.

2. The method of claim 1 wherein said step of forming the softened shaft into a flange includes the subsidiary step of providing a flange having a thickness less than a thickness of said application material.

3. The method of claim 1 further comprising the step of pressing said softened shaft of melt adhesive to the application material back side in order to adhere the ornamental element to the application material.

4. A method for applying ornamental elements, comprising the steps of:

providing an ornamental element having a head portion, said head portion having a back side of a given diameter and including a shaft of a melt adhesive material which is secured to said ornamental element back side;

providing an application material, having a perforation therein;

passing the shaft of melt adhesive provided on the ornamental element through the application material perforation;

supplying heat to the shaft to soften the melt adhesive;

forming the softened shaft by pressure into a flange wherein said step of forming the softened shaft into a flange continues until the flange has a larger diameter than a diameter of said ornamental element;

allowing the melt adhesive to cool.

5. The method claim 4 further comprising the step of pressing said softened shaft of melt adhesive to the application material back side in order to adhere the ornamental element to the application material.

* * * * *